Figure 9:
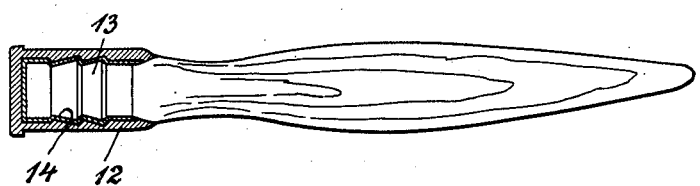

Jan. 15, 1935.  H. SUKOHL ET AL  1,987,760
AERONAUTICAL PROPELLER
Filed Feb. 15, 1932   2 Sheets-Sheet 1
Fig. 1
Fig. 2
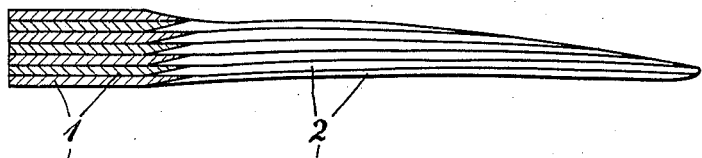
Fig. 3
Fig. 4
Fig. 5
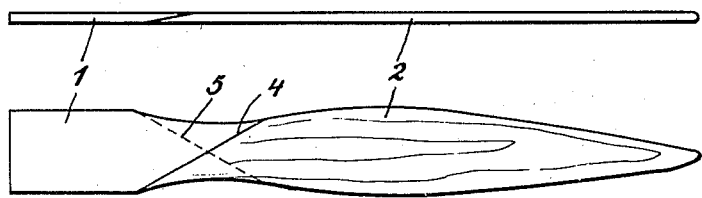
Fig. 6
Fig. 7
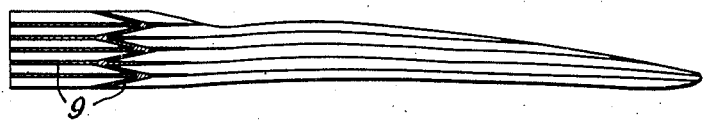
Fig. 8
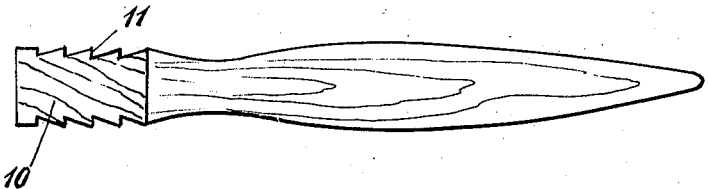
Inventors:
Heinrich Sukohl
and Ludwig Hoffmann
by
Frank Reinhold
Attorney.

Jan. 15, 1935.   H. SUKOHL ET AL   1,987,760
AERONAUTICAL PROPELLER
Filed Feb. 15, 1932   2 Sheets-Sheet 2

Inventors:
Heinrich Sukohl
and Ludwig Hoffmann
by
Frank Reichow
Attorney.

Patented Jan. 15, 1935

1,987,760

UNITED STATES PATENT OFFICE 1,987,760

AERONAUTICAL PROPELLER

Heinrich Sukohl, Berlin-Waidmannslust, and
Ludwig Hoffmann, Berlin-Hermsdorf, Germany Application February 15, 1932, Serial No. 592,878
In Germany February 16, 1931

13 Claims. (Cl. 170—159)

Our invention relates to improvements in aeronautical propellers, and more particularly in propellers made from wood.

As is known to those skilled in the art, the smaller the weight of the propeller, the smaller is the strain resulting from centrifugal force and the gyroscopic effect, and in this respect propellers made from wood are superior to those made from metal. For reducing the weight of the propeller it is preferred to manufacture the same from wood of light specific gravity. However, wood of very small specific gravity is not satisfactory for the reason, that the strength thereof in transverse direction is small, which is particularly objectionable in air propellers in which the blades are fitted within the hub, for example in propellers having adjustable blades. In such propellers the end of the blade fitted within the hub is subjected to high strain. The object of the improvements is to provide a propeller the gravity of which is small, and the hub portion of which has an increased strength, and with this object in view our invention consists in constructing the propeller in two sections, the blade being made from light wood and the hub portion, in part or entirely, from hard wood. Ordinarily propellers made from wood are composed of superposed and glued laminations, and in such laminated propellers the hub portion is preferably made, in part or entirely, from hard wood laminations and the blade portion from light wood laminations, the said sections of the propeller being rigidly connected with each other by a scarf-joint, and the jointed laminations interengaging one another with beveled or non-reduced ends.

Preferably use is made of a hard wood which can be readily impregnated by a suitable medium adapted to prevent the access of humidity. Further, between the jointed laminations layers of water-proof elastic material of high tensile strength, such for example as celluloid, may be interposed, the said layers having the function first to strengthen the laminations and to close the same in a water-proof way. Ordinarily we propose to use a natural hard wood. But we also contemplate the manufacture of the hub portion of the propeller from a comparatively light wood, which is impregnated with reinforcing or hardening matter such as artificial resin, the said impregnated hub portion being fixed to a blade portion made from light wood. Where both blades of the propeller are made integral, in lieu of the individual hub portions a single hub portion is provided which is made from hard wood and which has the blade portions made from light wood fixed thereto.

Figure 10:
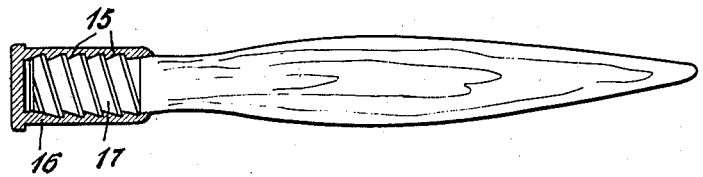
Figure 11:
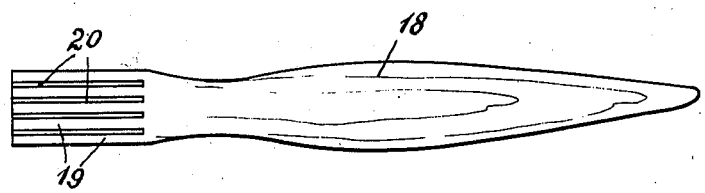
Figure 12:
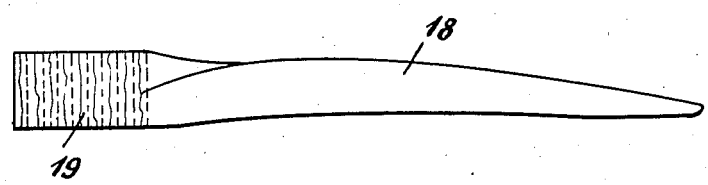
Figure 13:
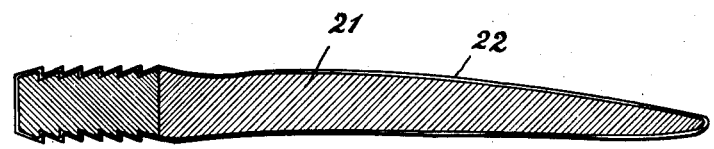
Figure 14:
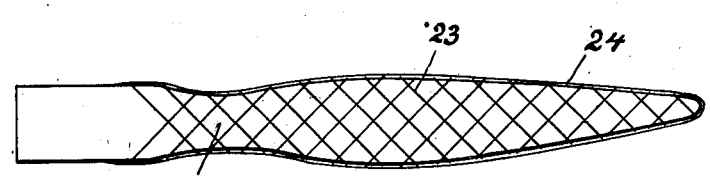
Figure 15:
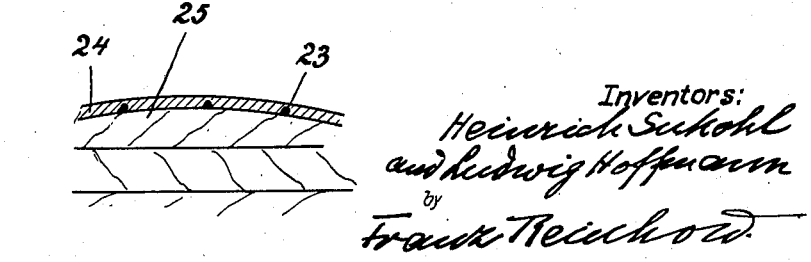

For the purpose of explaining the invention several examples embodying the same have been shown in the accompanying drawings in which the same reference characters have been used in all the views to indicate corresponding parts. In said drawings, Fig. 1 is a side elevation partly in section showing the propeller blade and its hub portion, Fig. 2 is a similar elevation showing a modification, Fig. 3 is a front elevation of the propeller blade shown in Fig. 2, Fig. 4 is a side elevation showing one of the laminations of the propeller composed of a blade portion made from light wood and a hub portion made from hard wood, Fig. 5 is a front elevation showing another modification in which the laminations are cut angularly at the joints, Fig. 6 is a side elevation partly in section showing another modification in which the laminations of hard and light wood are not reduced at their adjacent ends, Fig. 7 is a sectional elevation showing the hub portion of a modification in which layers made from water-proof material are provided between the laminations of the blade, Fig. 8 is a front elevation partly in section showing a modification in which the grain of the laminations providing the hub portion of the blade is disposed angularly of the blade, Fig. 9 is a front elevation partly in section showing a blade constructed according to any one of Figs. 1 to 7 and having the hub portion embedded in a reinforcing sleeve, Fig. 10 is a similar elevation showing a modification, Fig. 11 is an elevation showing a modification in which the hub portion is composed of parts made integral with the blade portion and laminations of hard wood, Fig. 12 is a side elevation of Fig. 11, Fig. 13 is a sectional elevation showing a modification in which any one of the propeller blades shown in Figs. 1 to 12 is provided with a protective coating, Fig. 14 is a front elevation showing a modification in which the blade is reinforced by wire netting embedded in a protective coating, and Fig. 15 is a partial sectional view showing the manner of embedding the wire netting illustrated in Fig. 14 in the protective coating.

In the example shown in Fig. 1 the propeller blade consists of a hub portion composed of laminations 1 of hard wood, such as beech, ash, nut, and the like, and a blade portion composed of laminations 2 made from light wood, such as balsa, pine, willow, etc. The laminations 1 and 2 are beveled at their adjacent ends, and they interengage one another to provide a scarf-joint, the laminations being united by a suitable cement, such as glue. As shown in Fig. 1, adjacent laminations 1 or 2 are beveled to opposite sides.

As stated herein, the hub portion is made from hard wood. But we wish it to be understood that the said hub portion may also be made from other hard material such as a composite material consisting of woven fabric or paper impregnated with a suitable binder, such as a phenolic condensation product.

The modification shown in Fig. 2 is similar to the one illustrated in Fig. 1. But the laminations 1 and 2 are respectively beveled to the same sides.

As appears from the front elevation shown in Fig. 3, the adjacent margins 3 of the beveled ends of the laminations are perpendicular to the longitudinal axis of the blade.

In Fig. 5 we have shown a modification in which the said edges 4 and 5 are disposed angularly of the longitudinal axis of the blades, and alternating edges may be arranged to intersect one another.

In the modification shown in Fig. 6 the hard wood laminations 6 of the hub portion and the light wood laminations 7 of the blade portion interengage one another with blunt edges 8. The figure also shows that the laminations 6 or 7 may be different in length. We wish it to be understood that also the laminations 1 and 2 which interengage one another with beveled ends may be different in length.

In Fig. 7 we have shown a modification in which layers 9 in the form of thin plates made from suitable water-proof and elastic material of high tensile strength, such as celluloid, are placed between the superposed laminations and the adjacent beveled end portions, which layers adhere or are glued to the wood laminations for rigidly connecting the same. By the said layers the access of humidity to the blades and warping of the propeller blade is effectively prevented. Preferably the said layers are united to the laminations by imbuing the wood laminations with a suitable solvent for the material from which the layers are made, whereupon the layers are placed between the laminations. The thickness of the interposed layers is such that they are dissolved only at their surfaces, while the inner parts thereof remain solid. The laminations and the intermediate layers are united by applying pressure in the cold.

As is indicated in Fig. 8 the hard-wood laminations 10 providing the hub portion of the propeller blade are cut so that the longitudinal grain thereof is disposed angularly of the axis of the blade, and preferably, the laminations 10 are arranged so that the grains of alternate laminations cross one another. By having the grain of the hard wood disposed transversely of the blade the strength of the threads 11 of the hub portion is increased, and the laminations can be more readily impregnated from the circumference of the hub portion, particularly if the said hub portion is formed with circumferential grooves, so that cuts made transversely of the grain are exposed through which the impregnating liquid has a ready access even to the deeper portions of the wood.

The said grooves have the function of securely holding the hub portion within a tubular hub or within a metallic sleeve, such as is shown at 12 in Fig. 9, which sleeve may be used for mounting the propeller blade on the hub. Preferably, the said sleeve or hub is fixed to the hub portion 13 of the propeller blade by means of a suitable cement 14, which is pressed into the gap between the blade and the sleeve in a plastic state, and which hardens after being applied to the gap. In order to insure a complete and reliable joint we prefer to use a cement such as lead glycerate which swells when hardening, or a cement which is forced into the gap under high pressure, so that after hardening the sleeve and the hub portion 13 are rigidly connected with each other.

In the modification shown in Fig. 10 the grooves 15 of the hub portion of the blade and the corresponding grooves of the sleeve 16 are helical in form, so that the sleeve 16 and the hub portion 17 of the blade may be united by screwing, a suitable cement being placed between the interengaging screw-threads. We have found that thereby the cement is uniformly distributed within the gap. The sleeve 16 reinforces the hub portion of the blade and prevents deformation thereof, even if the blade is rigidly fixed within the hub, the clamping pressure of the said hub being uniformly distributed all over the hub portion of the blade.

We wish it to be understood that any of the constructions shown in Figs. 1 to 7 may be combined with the hub or sleeve 12 or 16 shown in Figs. 9 and 10.

In Fig. 11 we have shown a modification in which also the hub portion of the blade 18 comprises portions 19 formed with longitudinal slots filled out by plates 20 made from hard wood, the grain of the said hard wood plates preferably running transversely of the longitudinal axis of the blade as is shown in Fig. 12. Thereby the high transverse strength imparted to the hub portion of the blade is increased.

In Fig. 13 we have shown a modification in which the tensile strength of the blade longitudinally of the axis thereof is increased by providing the blade 21 all over its length with a protective coating 22 made from a suitable cellulose material or artificial resin having a filling of linen, canvas, or another suitable fabric. The said coating takes up a high proportion of the forces caused by centrifugal action and directly transmits the same to the hub thus relieving the wood portion of the propeller from strain, so that an exceedingly light wood may be used for manufacturing the propeller blade which otherwise would not be able to take up the strain.

In Figs. 14 and 15 we have shown a modification in which the blade is reinforced by non-expansible flexible wire 23, for example steel wire, the said wire being coiled around the blade 25 and being, entirely or in part, embedded in a coating 24 of cellulose material or the like. We wish it to be understood that the wood part of the propeller shown in Figs. 13 and 14 is composed of light wood and hard wood, as has been described with reference to Figs. 1 and 12.

We claim:
1. A propeller having a blade portion of laminations of light wood, and a hub portion fixed thereto and containing laminations of hard wood, the laminations of said blade and hub portions being formed with beveled interengaging ends providing a scarf-joint.

2. A propeller comprising a blade portion made from light wood, and a hub portion fixed thereto and comprising laminations of hard wood disposed with their grain transversely of the axis of the blade.

3. A propeller comprising a blade portion made from light wood, and a hub portion fixed thereto and comprising laminations of hard wood disposed with their grain transversely and angularly of the axis of the blade.

4. A propeller comprising a blade portion composed of laminations of light wood, a hub portion comprising laminations of hard wood, and layers of a water-proof cementing material between said laminations of light wood and said laminations of hard wood.

5. A propeller comprising a blade portion made from light wood, and an impregnated hub portion fixed thereto and comprising laminations of hard wood having its grain running transversely of the longitudinal axis of said blade, said hub portion being formed with circumferential grooves.

6. A propeller having a blade portion composed of laminations of light wood, and a hub portion fixed thereto and containing laminations of hard wood, said laminations being different in length to provide tooth-shaped interengaging ends at the joint of said portions.

7. A propeller blade, comprising a hub portion adapted to be fixed to the hub of the propeller and containing hard wood, and an outer portion fixed to said hub portion and made from light wood.

8. A propeller blade, comprising a hub portion adapted to be fixed to the hub of the propeller and made from hard wood, and an outer portion fixed to said hub portion and made from light wood.

9. A propeller blade, comprising an outer portion made from a comparatively light material, and a hub portion adapted to be fixed to the hub of a propeller and comprising a solid body separate from said outer portion and made from a material harder than that of the outer portion, the said portions being formed with interengaging parts affording a plurality of longitudinal contacting surfaces cemented to each other.

10. A propeller blade, comprising an outer portion made from a comparatively light material, and a separate hub portion adapted to be fixed to the hub of a propeller and comprising a solid body made from a material harder than that of the outer portion, the said portions being formed with interengaging parts affording a plurality of longitudinal contacting surfaces united by layers of cement of a thickness such that the cement is able to transmit any forces exerted in service on said outer portion to the hub portion.

11. A propeller blade, comprising an outer portion made from a comparatively light material, and a separate hub portion fixed to said outer portion and adapted to be fixed to the hub of a propeller and comprising a solid body made from a material harder than that of the outer portion and extending transversely of the axis of the blade all through the body of said hub portion.

12. A propeller blade, comprising an outer portion made from a comparatively light material and a separate hub portion fixed thereto and adapted to be secured to the hub of the propeller and made from comparatively hard material, said blade and hub portion having toothed-shaped interengaging ends providing the joint.

13. A propeller blade, comprising an outer portion made from light wood, and a hub portion fixed thereto and adapted to be fixed to the hub of a propeller and made from hard wood, the said portions being formed with interengaging parts affording a plurality of longitudinal contacting surfaces cemented to one another.

HEINRICH SUKOHL.
LUDWIG HOFFMANN.